Nov. 7, 1950   A. AEPPLI   2,528,988
INDEX DEVICE FOR GEAR GRINDING MACHINES
Filed Aug. 18, 1947   2 Sheets-Sheet 1
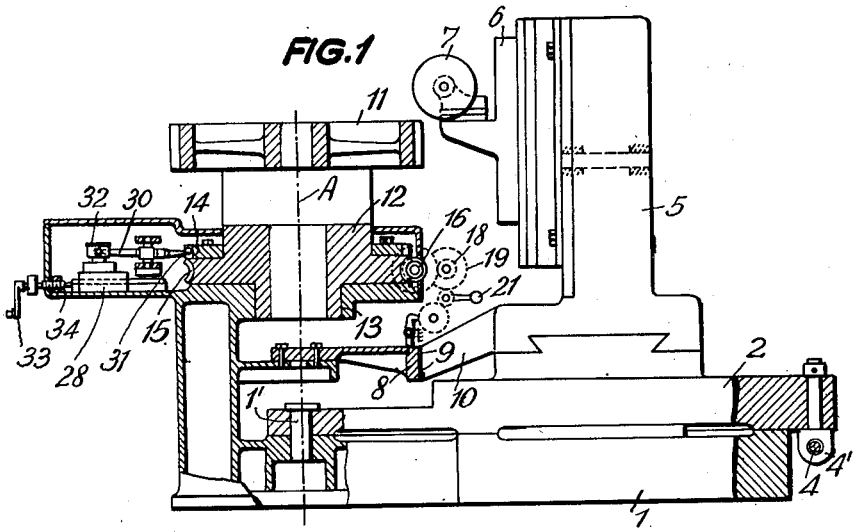
FIG. 1
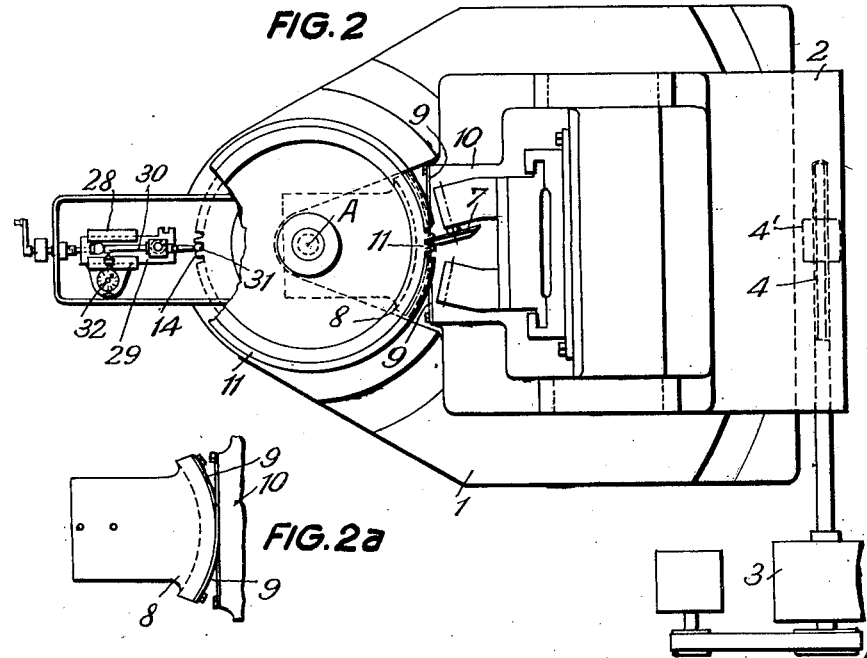
FIG. 2
FIG. 2a
INVENTOR:
Albert Aeppli
by Sommers & Young
Attorneys Nov. 7, 1950     A. AEPPLI     2,528,988
INDEX DEVICE FOR GEAR GRINDING MACHINES
Filed Aug. 18, 1947     2 Sheets-Sheet 2
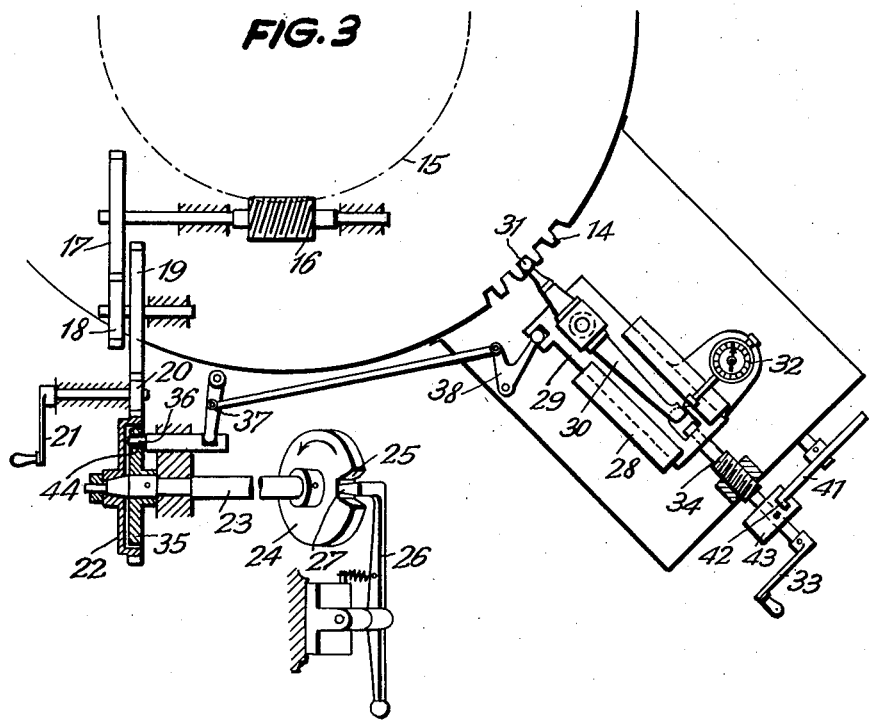
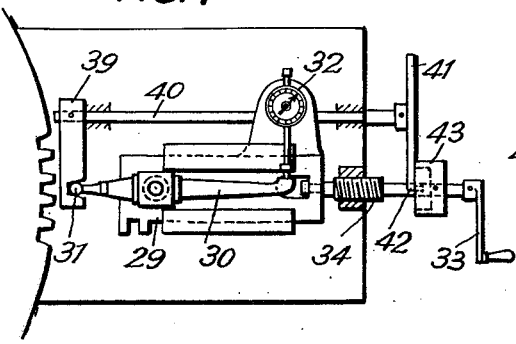
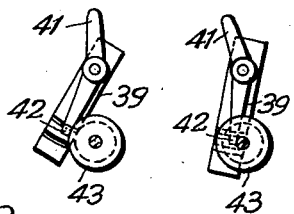
INVENTOR:
Albert Aeppli
by Sommers & Young
Attorneys Patented Nov. 7, 1950

2,528,988

UNITED STATES PATENT OFFICE 2,528,988

INDEX DEVICE FOR GEAR GRINDING MACHINES

Albert Aeppli, Zurich, Switzerland, assignor to Maag-Zahnräder und-Maschinen Aktiengesellschaft, Zurich, Switzerland Application August 18, 1947, Serial No. 769,251 In Germany November 16, 1942

Section 1, Public Law 690, August 8, 1946 Patent expires November 16, 1962

3 Claims. (Cl. 51—55)

1

This invention relates to dividing devices for gear grinding machines, particularly machines that are intended for grinding gears having a large diameter and that are provided with a dividing wheel coaxially arranged with the work to be machined as well as coarse dividing means.

In gear grinding machines the dividing, that is, the rotational advancing of the work to be machined relative to the tool intermittently by a tooth division is usually effected by means of precise dividing wheels. In so processing, at first the coarse dividing is effected by means of a dividing device of a known kind, whereupon, by way of example, in machines for machining average and small size gears a dividing pin moves into engagement with a tooth gap in the manner of a pawl, whereby the precise dividing of the work is ensured.

However, this known dividing method is not practicable if machines for machining large, heavy gears are concerned, for the reason that the fine dividing by insertion of a pin in a tooth gap requires that the work carrier can be turned and set into that correct position in an extraordinarily easy manner which is determined by the incidental movements of cooperation between the dividing bolt and the dividing wheel.

Again, a heavy gear causes too great an amount of friction to set up at the bearing portions of the device by which it is clampingly held for permitting the adjustment of the work carrier and the work into correct position with a precision of, for example, one-thousandth of a millimeter (1/1000 millimeter). Such adjustment becomes still more difficult due to the effect of the moment of inertia of the masses that are put in motion during the dividing operation, which brings with it, in conjunction with the frictional resistance and in dependence upon the velocity of revolution, that the gear either moves beyond the predetermined limit or is set at rest prematurely.

With a view to eliminating this drawback, the dividing device according to the present invention provides for an adjustable feeler member to cooperate with the dividing wheel instead of a dividing pin, which member functions so as to contact with the tooth flanks of the dividing wheel after having travelled approximately for the coarse amount of a tooth pitch, for the purpose of indicating on an indicating device the position of the tooth system of the dividing wheel and thereby also that of the tooth system of the work relative to the grinding tool, the dividing wheel being turned until the indicating device indicates a predetermined value.

2

By this means the above-mentioned detrimental effects of friction of the gear to be machined on the precision of the dividing, when the gear is turned, are eliminated as well as those that are due to movements of masses.

The operation of coarse dividing can be effected by any suitable means.

An embodiment of the invention is illustrated, by way of example only, in the accompanying drawings in which Fig. 1 shows an elevation of this embodiment partly in section;

Fig. 2 is a plan view thereof;

Fig. 2a shows a detail of Fig. 2;

Fig. 3 is a larger scale sectional plan view of the means for coarse and fine adjustment;

Fig. 4 is a similar illustration of the means for effecting the fine dividing operation, inclusive of associated control means, and Fig. 5a and 5b show the control means in various positions thereof.

On the bed 1 (Figs. 1 and 2) of the machine is mounted for turning movement about a pin 1' a table 2 by means of a gearing 3 through the intervention of a screw 4 and a screw nut 4'. This pin is situated in the vertical axis A of the work to be machined. On the table 2 a standard 5 is mounted for horizontal sliding movement on which a slide 6 carrying the grinding disc 7 is arranged so as to be vertically reciprocable. Concentric with the axis A is provided in firm screw threaded connection with the machine bed 1 a cylindrical rolling surface 8 to which are fastened two collateral tensioned rolling tapes 9 at opposite ends of said tapes, while the second ends of these tapes are screwed to a side arm 10 of the standard 5.

As the table 2 performs its pivotal movement, the tapes 9 roll on the cylindrical surface 8 the diameter of which corresponds to that of the pitch circle, that is, the rolling circle of the gear 11 to be worked so that the plane working surface of the grinding disc 7 describes an involute surface enveloping the tooth flank to be ground. The gear 11 bears on a clamping table 12 which is rotatably mounted free from play as much as possible in a guide 13 on the bed 1. Firmly connected with the clamping table 12 is a dividing wheel 14 the number of teeth of which is equal to the number of teeth or a multiple thereof of the work to be machined. During the grinding operation the clamping table 12 is always at rest together with the gear 11. As soon as a tooth on the work is completely ground the gear 11 must be advanced a tooth division. For this purpose the clamping table 12 is in the form of a worm wheel 15 which meshes, as shown in Figs. 1 and 3, with a worm 16 which can be turned by means of a hand crank 21 through the intermediary of interchangeable trains of transmission gears 17, 18, 19, 20.

For the purpose of effecting the coarse dividing operation preparatory to the grinding the gear 20 intermeshes with a second gear 22 on the shaft 23 of which a setting disc 24 is fixed which is provided with a recess 25. A rockable locking lever 26 carries a dog 27 for interengagement with the recess 25 of the setting disc 24 which can be turned after the dog 27 has been retracted from engagement with the disc 24 by means of the crank 21. On the performance of the required number of revolutions either only one or several revolutions of the crank 21 the dog 27 on the spring loaded lever 26 is let to move into the recess 25 of the disc 24 by snap action, in which way provision is made for the coarse dividing to take place. By this operation the work has been advanced only coarsely, that is, approximately for the amount of a tooth pitch, however, this amount does not come up to the requirements on the grinding of high precision gears. The present invention is for doing away with just that last named deficiency of fine dividing.

For this purpose a slide 29 is arranged for displacement in a horizontal guide 28 radially of the dividing wheel 14, as shown in Fig. 3. On this slide a lever 30 is rockably mounted as free from play as possible which lever carries at one of its ends a spherical feeler head 31 the diameter of which corresponds to the width of a tooth gap of the dividing wheel 14, whereas the other lever end is operatively connected with an indicating device 32. The displacing of the slide 29 is effected by means of a hand crank 33 by means of a screw 34. In order to prevent the coarse dividing mechanism 15 to 27 from being actuated while the feeler head 31 on the lever 30 engages with a tooth gap of the dividing wheel 14, between the mechanisms for the coarse and for the fine adjustment an efficient locking device is intercalated. This device includes a locking disc 35 which is secured to the shaft 23 and with which a slidably guided locking bolt 36 cooperates which is actuated by means of a leverage 37, 38.

The lever 38 is so coupled to the slide 29 of the fine dividing mechanism that as the head 31 of the feeler lever 30 interengages with a tooth gap of the dividing wheel 14 the locking disc 35 is retained by a locking dog 36 so that the coarse dividing mechanism is locked. The work to be machined is then rotatively advanced anew by means of the hand crank 21 but this time for adjusting the fine dividing mechanism. Obviously the rotational movements to be carried out for this purpose are only very small, for the reason that by the preceding coarse adjustment the predetermined value of dividing has been obtained already approximately. These small rotational movements as required are made possible by providing for the width of the recess 25 of the setting disc 24 to be greater than the size of the dog 27 on the locking lever 26 and the diameter of the hole 44 in the locking disc 35 to be somewhat larger than that of the locking bolt 36 cooperating therewith.

Since the grinding of a large size gear requires an accordingly great length of time, it is necessary to control the adjustment of the indicating device 32 relative to the feeler lever 30, 31 repeatedly. For this purpose a swingable template 39, as shown in Figs. 4, 5a and 5b, is provided in fixed relation with a shaft 40 which by means of a handle 41 can be turned into operative or inoperative position. Figs. 4 and 5a show the template in operative position, whereas Fig. 5b shows it in inoperative position. The position of the template 39 as required is determined by a knob 42 which is arranged on an extension of the handle 41 and which in ascertaining the adjustment of the indicating device 32 bears on the screw 34 (Figs. 4, 5a) and is situated in the interior of a drum 43 which is secured on the screw 34. The drum 43 keeps the template 39 from being moved into operative position while the dividing is in progress, as the knob 42 on the handle 41 would hit the liner of the drum 43 in turning the handle 41 in the respective direction. On the termination of the ascertaining of the setting of the indicating device 32 the template 39 can be swung back only after the slide 29 has been retracted by means of the crank 33 to such an extent that the knob 42 of the handle 41 can be moved past the side of the drum 43.

Operation of dividing: After a tooth of the gear 11 has been ground the grinding disc 7 is moved out of the range of the gear as shown in Fig. 1. The pairs of gears 17, 18 and 19, 20 are so chosen that by means of the worm drive 15, 16 the gear 11 is rotationally advanced just for one tooth pitch as the hand crank 21 completes one or several revolutions. In order to adjust the gear 11 the dog 27 on the locking lever 26 is retracted from the recess 25 in the setting disc 24 by pressure exertion on the locking lever 26, whereupon the hand crank 21 is turned in requisite manner one or several times and at the appropriate time moment the locking lever 26 is released so as to allow the dog 27 thereon to enter into engagement with the recess 25 of the setting disc by snap action, when the coarse dividing operation is completed.

By turning the hand crank 33 the head of the feeler lever 30 is then introduced into the tooth gap of the dividing wheel 14 until the head 31 contacts with the tooth flanks, thereby causing the pointer of the indicating device 32 to move. The transmission gears 17 to 20 have initially been so adjusted that at a certain angular range performed by the pointer which is kept in mind the head 27 of the locking lever 26 and the locking dog 36 stand centrally of the recess 25 of the setting disc 24 and of the hole 44 of the locking disc 35 respectively. By slightly turning the hand crank 21 the dividing wheel 14 is then rotated until the pointer of the indicating device 32 points to the spot having been noted. As the indicating device indicates the rocking movements of the feeler lever 30 in highly multiplied relation one is thus enabled to carry out the dividing of the work, which mainly determines the amount of precision of the tooth system to be ground, with utmost precision. The feeler head 31 is then moved out of the dividing wheel 14, whereupon the grinding of the respective tooth of the gear 11 is effected.

It is advisable to ascertain from time to time whether the dividing mechanism has undergone any changing of adjustment or not. For this purpose the template 39 is placed in front of the feeler head 31 by turning the handle 41 while the feeler lever 30 is in retracted position, whereupon the feeler lever 30 is advanced until the head 31 thereof penetrates into the template 39. The pointer of the indicating device 32 indicates the condition of operation by moving through a corresponding angular range. If no change has occurred in the course of the grinding operation the pointer must stand at the end of the same angular range as previously noted. After the feeler lever 30 has been restored the device is in condition for the next division control operation.

It is advantageous to locate the fine dividing means in the machine as closely as possible to the grinding disc. By this means the effects of eccentricity of the pitch circle of the dividing wheel 14 and of any backlash is eliminated.

I claim:

1. A gear grinding machine, comprising supporting means for fastening the work thereto, a grinding tool for grinding said work on said supporting means, a toothed dividing wheel coaxially arranged with said work, coarse dividing means coaxially arranged with said dividing wheel, adjustable feeler means for contacting with the tooth flanks on said dividing wheel after the coarse dividing having been effected in accordance with a length approximating the amount of a tooth pitch, an indicating device associated with said dividing wheel for indicating the position of the tooth system on said wheel and thus that of the tooth system of the work relative to said tool, the dividing wheel being turned until said device indicates a predetermined value, control means for checking the adjustment of said indicating device relative to said feeler means, and a movably arranged template for moving said feeler means into coupling engagement with said coarse dividing means without affecting said indicating device then indicating said predetermined value.

2. A gear grinding machine, comprising supporting means for fastening the work thereto, a grinding tool for grinding said work on said supporting means, a toothed dividing wheel coaxially arranged with said work, coarse dividing means coaxially arranged with said dividing wheel, a slide-supported lever functioning as an adjustable feeler means for contacting with the tooth flanks on said dividing wheel after the coarse dividing having been effected in accordance with a length approximating the amount of a tooth pitch, said slide and lever being movable together radially toward and from the dividing wheel, and an indicating device associated with said dividing wheel for indicating the position of the tooth system on said wheel and thus that of the tooth system of the work relative to said tool, the dividing wheel being turned until said device indicates a predetermined value.

3. A gear grinding machine, comprising supporting means for fastening the work thereto, a grinding tool for grinding said work on said supporting means, a toothed dividing wheel coaxially arranged with said work, coarse dividing means coaxially arranged with said dividing wheel, adjustable feeler means for contacting with the tooth flanks on said dividing wheel after the coarse dividing having been effected in accordance with a length approximating the amount of a tooth pitch, an adjustable carrier for said feeler means, coupling means for coupling said carrier to said coarse dividing means, including a locking disc secured to the coarse dividing means and a locking stop connected to said carrier and cooperating with said locking disc for limiting the further rotation of said dividing wheel to an amount corresponding to the fine dividing when said feeler means is moved into engagement with a tooth gap of said dividing wheel, and an indicating device associated with said dividing wheel for indicating the position of the tooth system on said wheel and thus that of the tooth system of the work relative to said tool, the dividing wheel being turned until said indicating device indicates a predetermined value.

ALBERT AEPPLI.

REFERENCES CITED

The following references are of record in the file of this patent:

UNITED STATES PATENTS

| Number | Name | Date |
| --- | --- | --- |
| 531,817 | Warren | Jan. 1, 1895 |
| 903,106 | Phelps | Nov. 3, 1908 |
| 1,462,985 | Schurr | July 24, 1923 |

FOREIGN PATENTS

| Number | Country | Date |
| --- | --- | --- |
| 408,394 | Great Britain | Apr. 12, 1934 |